US006871062B2

(12) United States Patent
Trop et al.

(10) Patent No.: US 6,871,062 B2
(45) Date of Patent: Mar. 22, 2005

(54) "CALLING PARTY PAYS" CELLULAR AND PREPAID PLATFORMS FOR CELLULAR CALLING SYSTEMS

(75) Inventors: David Trop, Newark, NJ (US); Eli Silberstein, Newark, NJ (US)

(73) Assignee: IDT Corporation, Newark, NJ (US)

( * ) Notice: Subject to any disclaimer, the term of this patent is extended or adjusted under 35 U.S.C. 154(b) by 508 days.

(21) Appl. No.: 09/761,224

(22) Filed: Jan. 16, 2001

(65) Prior Publication Data

US 2002/0147002 A1 Oct. 10, 2002

(51) Int. Cl.[7] .................................................. H04G 7/20
(52) U.S. Cl. ...................... 455/406; 455/405; 455/407; 455/408
(58) Field of Search ............................... 455/406, 405, 455/408; 379/114.01, 111, 112, 127.05, 114.02, 114.04, 114.21, 126

(56) References Cited

U.S. PATENT DOCUMENTS

| | | | | |
|---|---|---|---|---|
| 5,557,664 A | * | 9/1996 | Burns et al. ........... | 379/127.05 |
| 5,579,379 A | * | 11/1996 | D'Amico et al. ...... | 379/114.01 |
| 5,778,313 A | * | 7/1998 | Fougnies ................ | 455/406 |
| 6,029,062 A | * | 2/2000 | Hanson .................. | 455/408 |
| 6,169,891 B1 | * | 1/2001 | Gorham et al. ......... | 455/406 |
| 6,546,238 B1 | * | 4/2003 | Nightingale et al. .... | 455/406 |
| 6,556,818 B1 | * | 4/2003 | Meehan .................. | 455/406 |

* cited by examiner

Primary Examiner—Jean Gelin
(74) Attorney, Agent, or Firm—Gottlieb Rackman & Reisman

(57) ABSTRACT

A subscriber to a wireless service provider can make calls in a conventional manner, and can receive calls from a caller in a mode in which the caller rather than the subscriber is charged. More particularly, a request for connection to the subscriber from the caller is received by an administrating server which determines if the call can be charged to the caller and then generates such a charge. Preferably the administrating server is part of a payment platform provided to generate an account for the subscriber to pay for outgoing (and, selectively, incoming) calls.

20 Claims, 5 Drawing Sheets

Calling Party Pays Cellular System Architecture

Figure 2

"CALLING PARTY PAYS" CELLULAR AND PREPAID PLATFORMS FOR CELLULAR CALLING SYSTEMS

BACKGROUND OF THE INVENTION

A. Field of Invention

This invention pertains to wireless telephone systems, and more particularly to a system in which a wireless call can be paid by either a telephone subscriber or by the calling party. The system described herein is adaptable to operate in conjunction with both prepaid and postpaid wireless systems. Although the invention is described in conjunction with cellular telephone systems, its principles are equally applicable to other wireless telephone systems such as satellite systems and the like.

B. Description of the Prior Art

Presently, at least in the United States, a cellular telephone subscriber (i.e., the person or entity responsible for payment for services) is charged for both incoming and outgoing calls and receives a bill for these charges on a regular basis (for example, once a month). This arrangement discourages subscribers from maximizing the use of their telephones both with respect to the amount and duration of these calls. For example, in many instances, subscribers do not give out their cellular telephone numbers because they do not want to be charged for undesirable or excessive incoming calls. In fact, in order to protect themselves even further, many subscribers shut off their cellular telephones completely between outgoing calls. Hence very often callers desiring to reach these subscribers cannot reach these subscribers even if the callers have information important to the subscribers. This arrangement is therefore disadvantageous to callers and subscribers.

The arrangement is also disadvantageous to cellular service providers (CSPs) since they are in the business of selling 'air time' during which callers are connected to subscribers. If subscribers intentionally limit the number of their calls by distributing their telephone numbers only to a small number of potential callers and/or by turning off their cellular telephones, the net voice traffic and revenues of the CSPs are naturally reduced. A further disadvantage to CSPs is that potential subscribers, used to the To conventional land-based telephone systems in which the calling party always pays for each call (with the exception of special services, like collect calls), may not join a cellular telephone system at all because they are cost conscious.

There are two billing systems presently available for the payment of telephone communication (including wireless communication) services: post paid (or standard) and prepaid. When a subscriber signs up for postpaid billing, he receives a bill on a regular basis (typically once a month) for communication charges previously incurred. In this system, a subscriber can charge as much or as little as he wants on his bill.

Prepaid billing refers to a system in which a subscriber prepays for communication services. In this system, a subscriber either buys a card of a predetermined face value, for which then an account is established, or establishes a prepaid account with predetermined funds. Thus each account is good for a certain amount of air time. When the air time for a certain account is used up, the customer must pay for additional air time before he is allowed to access the communication services.

Both billing systems are available for land-based and wireless communication systems.

A customer using a prepaid cellular telephone is charged for incoming calls, just like the standard cellular telephone customer, so that each incoming call reduces the amount of air time available to that customer. Thus existing prepaid cellular telephone systems have the same disadvantages as the postpaid cellular telephone systems described above.

OBJECTIVES AND SUMMARY OF THE INVENTION

In view of the above-mentioned disadvantages of the conventional cellular telephone systems, it is an objective of the present invention to provide a cellular telephone system arranged to allow a 'calling party pays' or CPP mode of operation.

A further objective is to implement a CPP mode of operation in existing prepaid and postpaid cellular systems using standard protocols.

Yet another objective is to provide a cellular telephone system with a CCP mode which incorporates a platform capable of providing prepaid and postpaid billing.

A further objective is to provide a cellular telephone system in which a subscriber is given several choices with respect to who should incur the cost of incoming calls.

Other objectives and advantages of the invention shall become apparent from the following description.

Briefly, a system constructed in accordance with this invention is composed of a CSP associated with a plurality of subscribers having cellular telephones. The system can be used by either postpaid subscribers who are billed for services after the charges are incurred, and prepaid subscribers who are participants in a prepaid service plan. Billing is handled by a platform consisting of an administrating server, a switching network and a data base.

As previously described, in both prepaid and postpaid systems, calls made to a land-based telephone are charged only to the caller, while calls made to a cellular telephone are charged to both the caller and the subscriber. The present system can provide several options for paying for incoming calls, in accordance with selections made primarily by the subscribers. One option, which may be referred to as a 'calling party pays' or CPP option, allows a pre-established number of the incoming calls (depending, for example, on the identity of the caller) to be charged only to the caller's account. When the administrating server receives the request from the caller, it first checks if the call is chargeable to the caller. The term 'chargeable' is used to indicate that (1) the caller is calling from a telephone that can be charged by the administrating server; and (2) that the caller has indicated that he is willing to pay for the charges. If the call is chargeable to the caller, then the connection is established. If the call is not chargeable, then alternate financial arrangements are made to pay for the call, either by the subscriber or by the caller.

Another option, referred to as the 'subscriber pays' or SP option, allows a subscriber to pay for all the charges associated with an incoming call. This option may be selected, for example, by a parent receiving calls from his children.

A third option, referred to as the 'conventional payment' or CP option is used to revert to the conventional operation wherein the costs of incoming calls to cellular telephones are allocated between the calling party and the subscriber.

The selection of a payment option is made based on some preselected criteria defined by the subscribers, for example when an account is set up for a subscriber, or at the beginning of an incoming call. Some of the criteria used to select a payment option may include the identity of the caller, the telephone number from which the call is made, his geographic location, the time of day, or week, and other criteria.

The administrating server can be connected by a direct trunk or other known means to the cellular service provider. In this arrangement, each subscriber may be identified by a simple code and standard telephone protocols are followed.

DETAILED DESCRIPTION OF THE INVENTION

Figure 1:
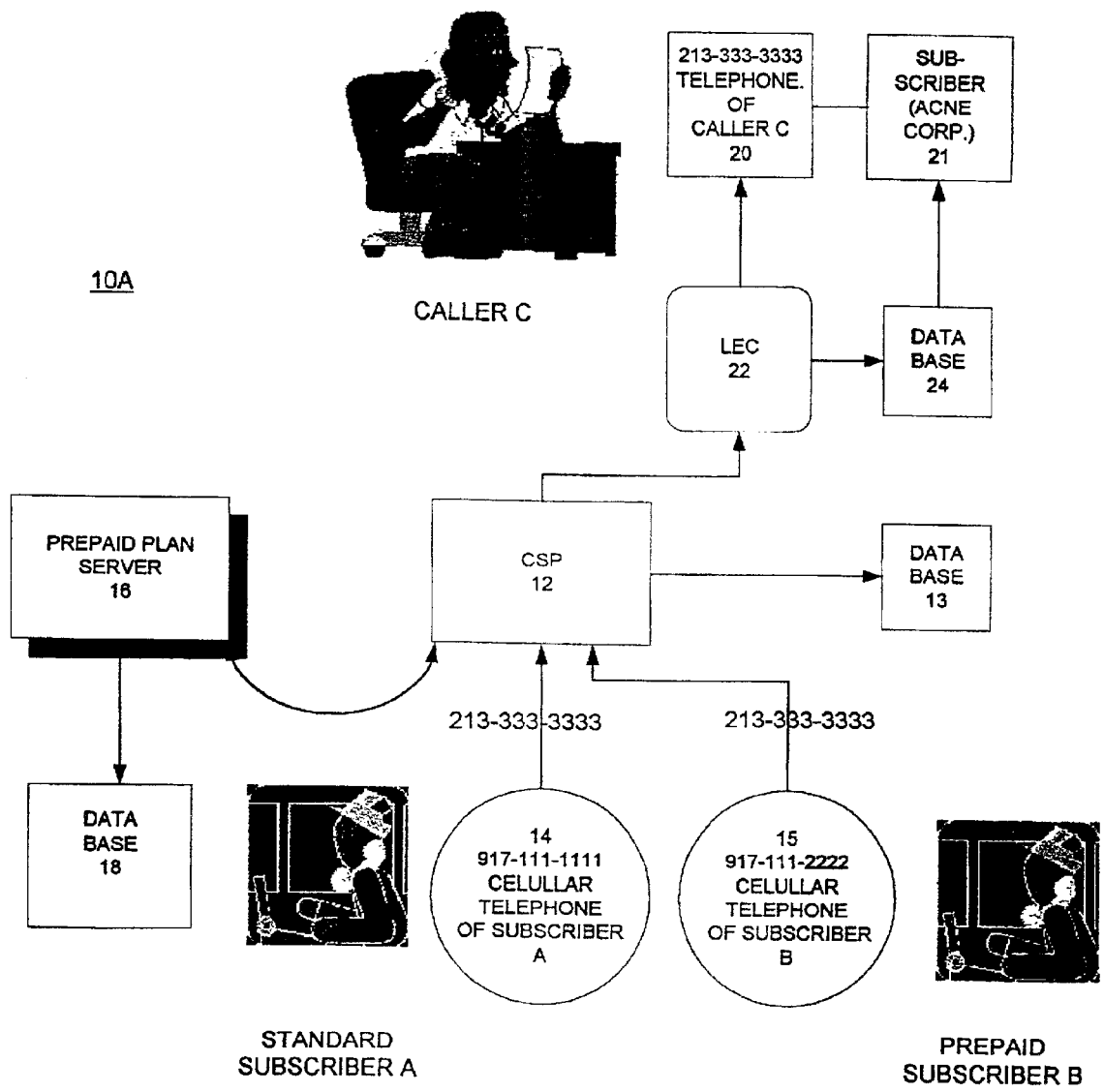
FIG. 1 shows a block diagram of a prior art cellular telephone system showing outgoing calls from a postpaid and a prepaid subscriber.

In order to provide a better understanding of the invention, a prior art system is first described in which both postpaid and prepaid cellular telephones may be used. Referring now to FIG. 1, the system 10 includes a cellular service provider or CSP 12 which provides cellular telephone service to several subscribers, such as subscribers A and B having respective cellular phones 14 and 15. Subscriber A in this discussion is a postpaid or standard plan subscriber while subscriber B is a prepaid plan subscriber.

Charges for calls made from or to cellular telephone 14 are recorded in a data base 13 by CSP 12 and are eventually sent to Subscriber A for payment. (For the sake of simplicity, in the following discussion, it is assumed that subscribers A and B are responsible for the payment of communication services on telephones 14 and 15, respectively, it being understood that in some instances, other parties (such as the employers) may be responsible for this payment.)

Calls associated with prepaid subscribers are handled by a prepaid plan server 16. This server 16 stores information in a data base 18 used to monitor the telephone calls made and received by prepaid subscribers. The server 16 and the CSP 12 may be at the same location. Alternatively, the server 16 may be operated by, for instance, a third party who has made an arrangement with the CSP 12 to buy air time in bulk and to resell this air time to individual subscribers.

According to the prepaid plan, the subscriber B buys a cellular telephone 15 and pays for some air time of predetermined duration. The server 16 then opens an account for subscriber B and credits the account for the amount paid by subscriber B.

In FIG. 1 standard cellular telephone 14 is assigned a telephone number such 917-111-1111 while prepaid cellular telephone 15 is assigned a number such as 917-111-2222. Subscriber A can make a call, for example to a person C using a telephone 20, having the telephone number 213-333-3333 as follows: Subscriber A activates his cellular telephone 14 and dials the number 213-333-3333. Cellular telephone 14 next sends a corresponding request for a connection to CSP 12. In response to this request, the CSP 12 establishes a standard telephone connection to telephone 20 through a local exchange carrier (LEC) 22. The LEC 22 is associated with a data base 24 used to collect data on calls made to and from telephone 20.

Once the telephone connection is established, the subscriber A and person C can talk to each other in the conventional manner. In this case, since the subscriber A has initiated the call, the charges for this call are calculated by CSP 12 and subscriber A's account in data base 13 is therefore billed in the usual manner. The telephone 20 can be a cellular telephone, a land-based fixed telephone, and so on.

In FIG. 1 and the following discussion it is assumed that person C is an employee of the Acne company 21 and hence for the purposes of system 10 the subscriber for C's telephone set 20 is the Acne company.

If person C calls the subscriber A, the process described above is reversed. That is, person C (who, in this case is the caller) dials the subscriber's number, i.e., 917-111-1111. When the LEC 22 receives this number, it routes the call to the subscriber A through the CSP 12. In this case both the Acne company 21 and the subscriber A get charged for the call. These charges are accumulated in data bases 24 and 13, respectively.

Telephone calls to and from prepaid subscriber B are performed similarly, except that charges for subscriber B must be debited to his account in data base 18 by server 16 in real time and therefore it must bridge the call from subscriber B to Subscriber A. Therefore, when subscriber B dials C's number, 213-333-3333, the CSP 12 does not make the connection immediately but instead refers to server 16 and requests instructions. Server 16 checks the finds in subscriber B's account and if these funds are sufficient, it authorizes the CSP 12 to complete the connection. Moreover, during the conversation between B and C, the server 16 continuously debits B's account in real time and if it is exhausted, the server 16 instructs the server 12 to terminate the call.

Subscriber B may elect to replenish his account for the prepaid plan by presenting a credit card. In this case, when the account drops to a predetermined minimum amount, the server 16 may either charge a fixed amount automatically to the subscriber B's credit card, or may request the subscriber B's express permission to charge the card and then replenish the account.

Figure 2:
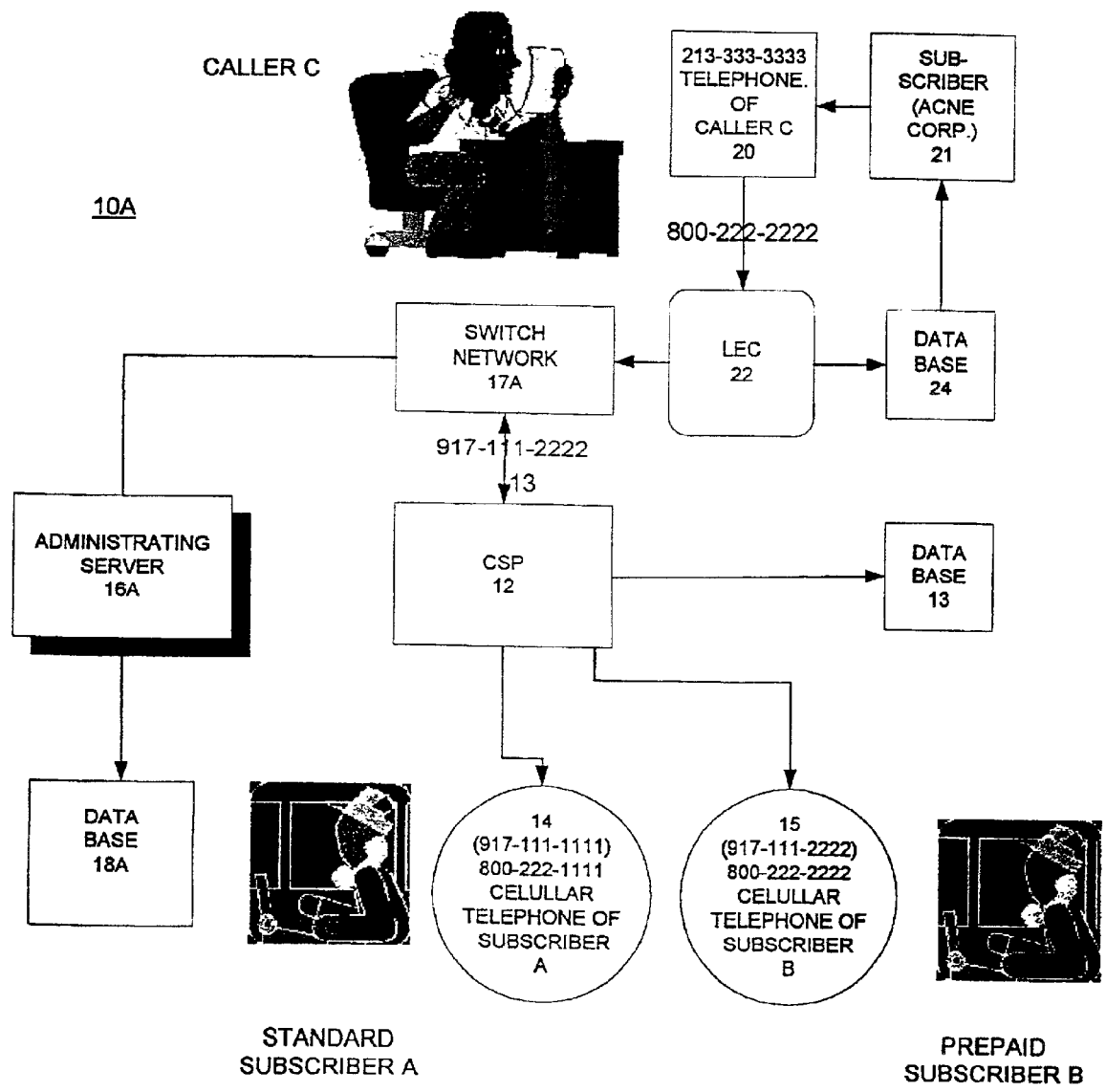
FIG. 2 shows a block diagram of a cellular telephone system constructed in accordance with this invention and indicating an incoming call to a subscriber.

FIG. 2 shows a system 10A modified in accordance with this invention. In this system, calls made by standard subscriber A or prepaid subscriber B to a person C are charged in the same manner as in the prior art system, described above. The difference in the system is the manner in which payment is charged for incoming calls to Subscribers A and B.

According to the present invention, the system 10A is arranged so that payment for each incoming call is made in accordance with one of several options selected by the subscribers. For example, one payment option is the 'calling party pays' or CPP option. In this payment option the total cost of a call from any party is charged to that party.

Another payment option is the 'subscriber pays' (SP) option according to which the subscriber being called pays all costs and caller C pays nothing.

Also, the system can be adapted to operate in the same manner as the system 10 of FIG. 1. This mode shall be referred as the 'conventional payment' or CP option and allows the system to charge subscriber A using a postpaid option and subscriber B in a prepaid option in a normal manner.

As will be described in more detail below, the subscribers A and B also have the option of determining which option they want dependent on the identity of the caller, a telephone number, etc.

In system 10A, the prepaid plan server 16 is replaced by an administrating server 16A which performs all the functions of server 16, but it also performs some additional functions associated with other types of payment plans and corresponding modes of operation. Associated with administrating server 16A is a data base 16A used to maintain the accounts of all the prepaid subscribers.

System 10A further includes a switching network 17A. This switching network is controlled by the administering server 16A.

In the systems of FIGS. 1 and 2, subscribers A and B are assigned unique telephone numbers by the CSP 12, such as 917-111-1111 and 917-111-2222, respectively. In system 10A, however, the subscribers A and B are each assigned a second number by server 16A. For example, subscriber A may be assigned the second number 800-222-1111 and subscriber B may be assigned the second number 800-222-2222. As far as subscriber A is concerned, his number is 800-222-1111 and not 917-111-1111. As far as subscriber B is concerned, his number is 800-222-2222. The data base 18A includes a cross-reference table relating numbers assigned to subscribers A and B by CSP 12 and server 16A respectively. Preferably, the number assigned to subscribers A and B are 'toll free' numbers, i.e., such as those beginning with the prefix '800' or '888' so that when the caller C dials A's or B's second number, caller C's account is not charged as a regular call (although it may be charged if the CPP option or Is the CP option is selected). The data base 18A is also used to keep track of the accounts of the prepaid subscribers, such as subscriber B.

The data base 13A is used to track the account of standard subscribers such as subscriber A and to generate bills for the account at regular intervals.

Figure 3:
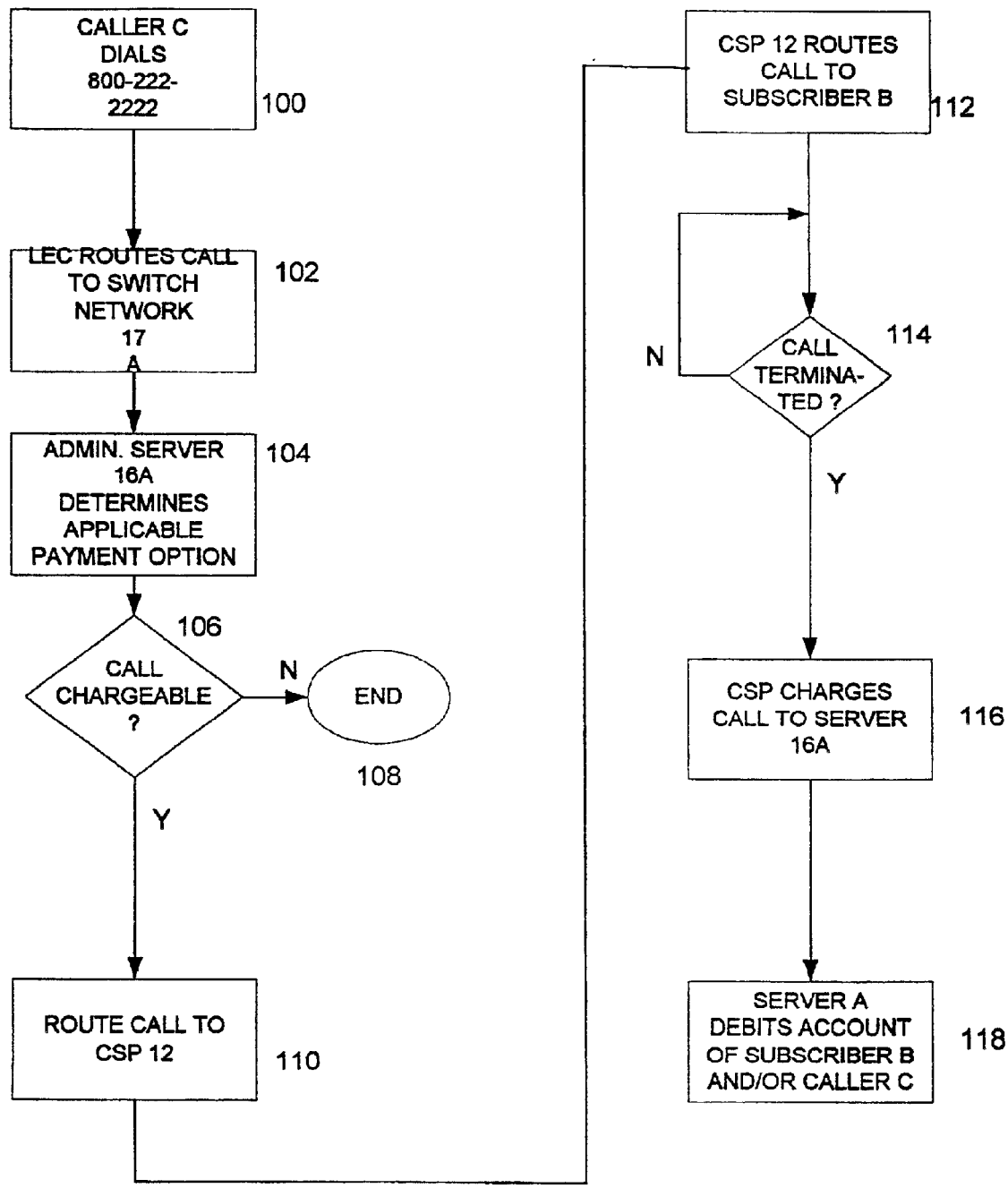
FIG. 3 shows a flow chart for the general operation of the system of FIG. 2.
Figure 4:
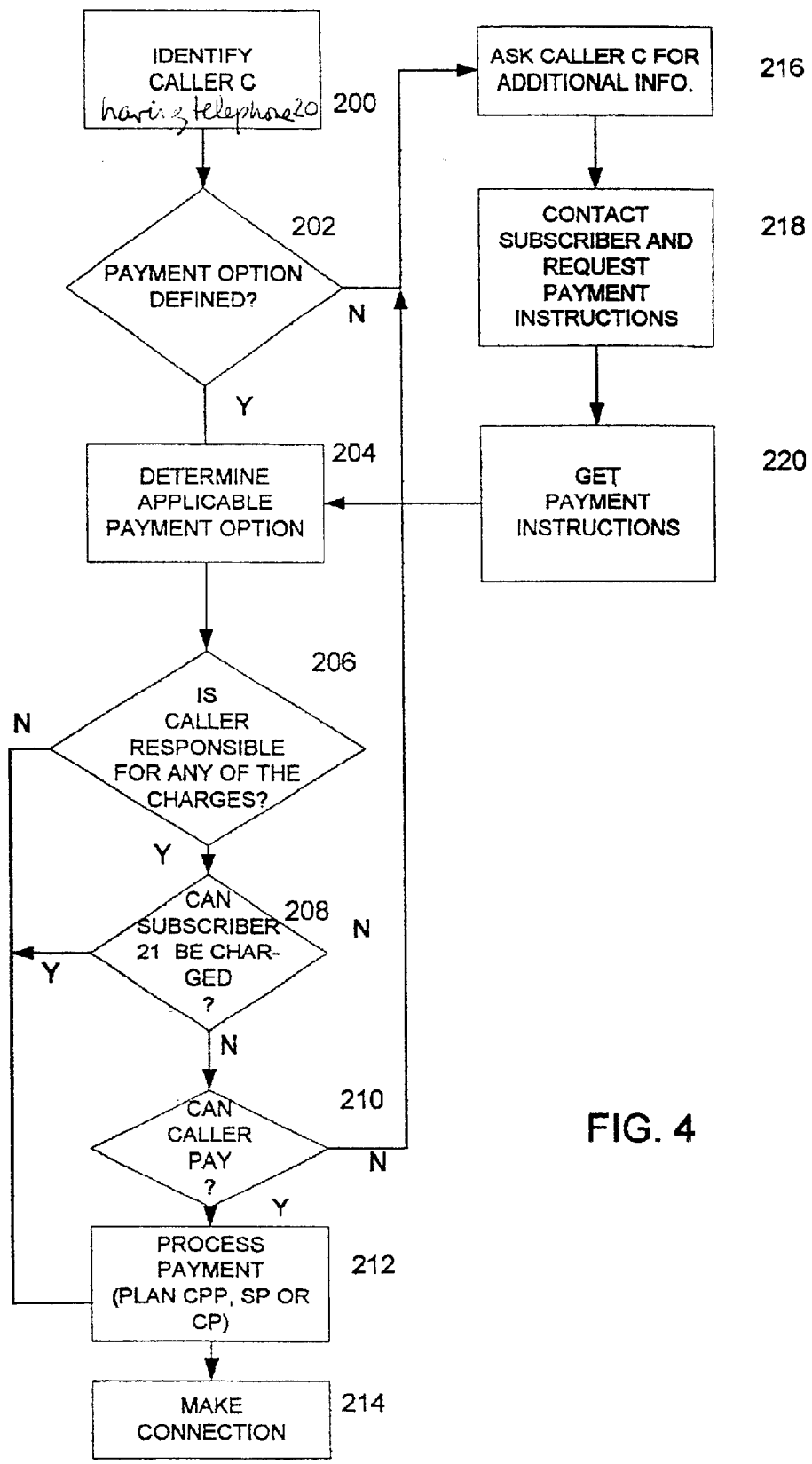
FIG. 4 shows a flow chart indicating a process to determine how a call is to be charged and who is responsible for the resulting charges.

The process for making telephone calls using the system 10A is now described first generally in conjunction with FIG. 3, and then in more detail, in conjunction with FIG. 4.

In FIG. 3, in step 100, caller C initiates the process by dialing subscriber B's published number (800-222-2222). LEC 22 routes the call to switch network 17A (step 102). Next, the switch network 17A informs the server 6A that a request for connection to subscriber B has been received and in step 104 server 16A determines the applicable payment option, i.e., whether this call is chargeable to caller C and/or whether it should be handled in accordance with a CPP, SP or CP payment option. Details of how this decision is made are discussed below. Next, in step 106 the server 16A determines if the call can be charged in accordance with the plan previously selected by the respective subscriber (in this case, subscriber B). If in step 106 the server 16A determines that this call cannot be charged to caller C or subscriber B then in step 108 an automatic audible message is sent to the caller C indicating that the call cannot be completed, and the call is terminated.

If the call can be charged to either the subscriber B or company 21, then in step 110 the server 16A sends an instruction to the switch network 17A to route the call to CSP 12, indicating that this call is to be connected to cellular telephone 917-111-2222. In response to the instruction from the server 16A, the switch network 17A then routes the call to the CSP 12. The switch network 17A is connected to the CSP 12 by a standard trunk or PSTN line 13.

In step 112 the CSP 12 routes the call to the subscriber B and communication is established.

In step 114 both the CSP 12 and the server 16A monitor the on-going call. In step 114 a check is performed by both the CSP 12 and server 16A to determine if the call has been terminated. When the call has been terminated (either by the server, by the parties, or for other reason) in step 116 the CSP 12 generates a bill to server 16A corresponding to this call. For example, for a CPP option with a prepaid subscriber, the call may be terminated if the server 16A has determined that the subscriber's account is exhausted and cannot be replenished automatically.

In step 118, the server 16A generates a charge which is debited to the account of the appropriate party, i.e. subscriber B and/or the Acme Company 21. Depending on the contractual obligations of the parties, this charge may be related to the charge billed by CSP 12, or maybe completely unrelated.

When caller C places a call to subscriber A, the process used to establish and maintain a communication path is similar to the one shown in FIG. 3, except that server 16A charges except that charges for subscriber A (if any) are sent to the number A's account in database 13.

As mentioned above, in step 104 the administrating server 16A determines what payment option has been selected by the respective subscriber for incoming calls and whether the caller C or the Acne company 21 can be charged at all. This selection may be made by the subscriber, based on some general rules, caller-specific rules or a combination of the two. Alternatively, a payment option may be selected dynamically or at the time the call is received.

A set of rules for the CPP option is given in the following table:

| CALLER | ACCEPT ALWAYS | ACCEPT ON WEEKDAYS | ACCEPT ON WEEKENDS | NEVER ACCEPT | ASK ME BEFORE ACCEPTING |
|---|---|---|---|---|---|
| AREA CODE 212 | | X | | | |
| AREA CODE 201 | | X | | | |
| AREA CODE 516 | | X | | | |
| AREA CODE 561 | | | | X | |
| AREA CODE 703 | | | | X | |
| AREA CODE 801 | | | | X | |

-continued

| CALLER | ACCEPT ALWAYS | ACCEPT ON WEEKDAYS | ACCEPT ON WEEKENDS | NEVER ACCEPT | ASK ME BEFORE ACCEPTING |
|---|---|---|---|---|---|
| #301-1234 | X | | | | |
| #310-4321 | | | X | | |
| #103-1243 | | | | X | |
| ALL OTHERS | | | | | X |

As indicated in this table, the subscriber has elected to receive calls under the CPP option from area codes 212, 201, 516 (for example, where the subscriber may have a lot of business customers) if the calls are made on weekdays. Calls from some area codes or numbers, such area code 561 or telephone number 103-1243 are never accepted. Calls from telephone number 310-4321 are accepted on the weekends only. Calls from telephone number 301-1234 are always accepted. Finally a catch-all group is also defined ('ALL OTHERS') for which the subscriber has requested that he be notified of a call so that he can decide on a payment option.

Similar rules may be set up for each of the other options SP and CP. Moreover, the rules may be defined such that some callers may be covered by more than one option.

The process for determining a payment option for an incoming call to subscriber B in step 104 of FIG. 3 and determining if the call is chargeable performed in step 106 of FIG. 3 is illustrated in more detail in FIG. 4. In step 200 the telephone 20 of caller C is identified using his caller ID, or other information normally incorporated in the message requesting contact with subscriber B. In step 202 a check is performed to determine if a payment option is defined by subscriber B for calls originated from telephone 20 (and/or caller C) by one of the rules. If a payment option is specified by the rules, then the parameters of the option are determined in step 204. In step 206 a check is performed to determine if the payment option found in step 204 requires the caller (or in this case the Acme Company) to pay any charges. For example, if the CPP option is selected then the caller (or in this case, the Acme Company) is responsible for all the charges for the call. If the conventional plan (CP) is selected then the Acme Company is responsible for the normal charges. If the subscriber pays (SP) plan is selected the charges then obviously Acme Company/caller C is not responsible for any charges and the payment process is initiated in step 212.

If the caller is responsible for any charges, then in step 208 a check is performed to determine if the Acme Company can be charged or billed automatically. More specifically, as part of the check of step 208, the administrating server 16A must determine whether the Acme Company or the telephone 20 meets several criteria. The first criteria is that telephone 20 be a billable type of telephone set. A public telephone, a telephone in a governmental office, a library, a prison is not a billable telephone because, obviously, telephones at these sites are not associated with the caller, although the caller C may be billed even in these instances as shall be discussed more fully below. This determination regarding whether caller C can be billed may be made from the transmission received from caller C requiring the connection, which normally includes a code (the II digits) identifying the type of telephone being used.

Another criteria is that the Acme Company must be credit worthy. The server 16A can contact the data base of a third party such as a credit clearing house (not shown) with information on specific subscribers, including payment history, present balance of the subscriber's telephone bill, the subscriber's credit rating and other credit information for the subscriber.

Another criteria is the ability of server 16A to charge the Acme Company for calls made by telephone 20. This criteria is dependent on the policies of the LEC 22 or other entities associated with the Acme Company, and the contractual relations with the server 16A. Again this information may be obtained from a third party, such as a clearing house data base, which can maintain a list of servers such as LEC 22 which accept or allow remote entities to charge their subscribers.

These are just some exemplary criteria that may be used, it being understood that the server 16A may be adapted to use only some of these criteria. Moreover the server 16A may use other criteria as well.

If in step 208 it is determined that the Acme Company can be charged for the call, for example, because the three criteria (and any others) or any one of them described above have been met, then the payment process is initiated in step 212. If the call cannot be charged to Acme Company 21, then in step 210 a check is performed to determine if the call can be charged by another means C. For example, a message can be sent to the caller indicating that the call cannot be completed unless another means to pay for the charges is acceptable. The caller may select to pay with a credit, a debit or a telephone calling card. The server 16A then contacts a third party service which obtains the information required for this means of payment and processes the same.

If in step 210, the caller agrees to pay and payment is approved by the third party then the payment process is initiated in step 212.

In step 214 the connection is made between caller C and subscriber B.

If no payment option is defined by the rules in step 202, for example, because the caller C could not be identified, or because the caller has been classified in the 'ASK ME' category, or even if the caller cannot or does not wish to pay for any charges, then in step 216 caller C is contacted for additional information that could be used to identify him to subscriber B. For example, the caller may be asked to state his name and/or a brief message for subscriber B.

In step 218 subscriber B is then contacted by the administrating server 16A and notified that caller C is requesting connection and that no payment option has been selected or can be collected automatically for this caller. Therefore B is given the opportunity to take select a payment option for the call or to not accept the call. In step 220 the selection made by subscriber B (if any) is obtained and the selected payment option is either processed in step 204 or the connection is terminated.

Going back to step 104 in FIG. 3, if the SP (subscriber pays) option is selected then the administrating server 16A sets its billing programs to bill only the called subscriber. The connection is then made in steps 110–112.

If the CP (conventional payment) option is selected then the administrator server 16 sets its payment programs to bill both the subscriber B and the caller C and the connection is made in steps 110–112, as discussed above in conjunction with FIG. 3. Of course, even under this scenario it must be determined if caller C can pay.

In the above-discussion a call to prepaid cellular subscriber B is discussed. A similar protocol is used when a call is made to standard cellular subscriber A but the costs of the call to A are sent to the CSP 12 which then bills the account of subscriber A in data base 13. Alternatively the data base 13 may be coupled directly to server 16A and hence this latter server can handle the bills to subscriber A.

Figure 5:
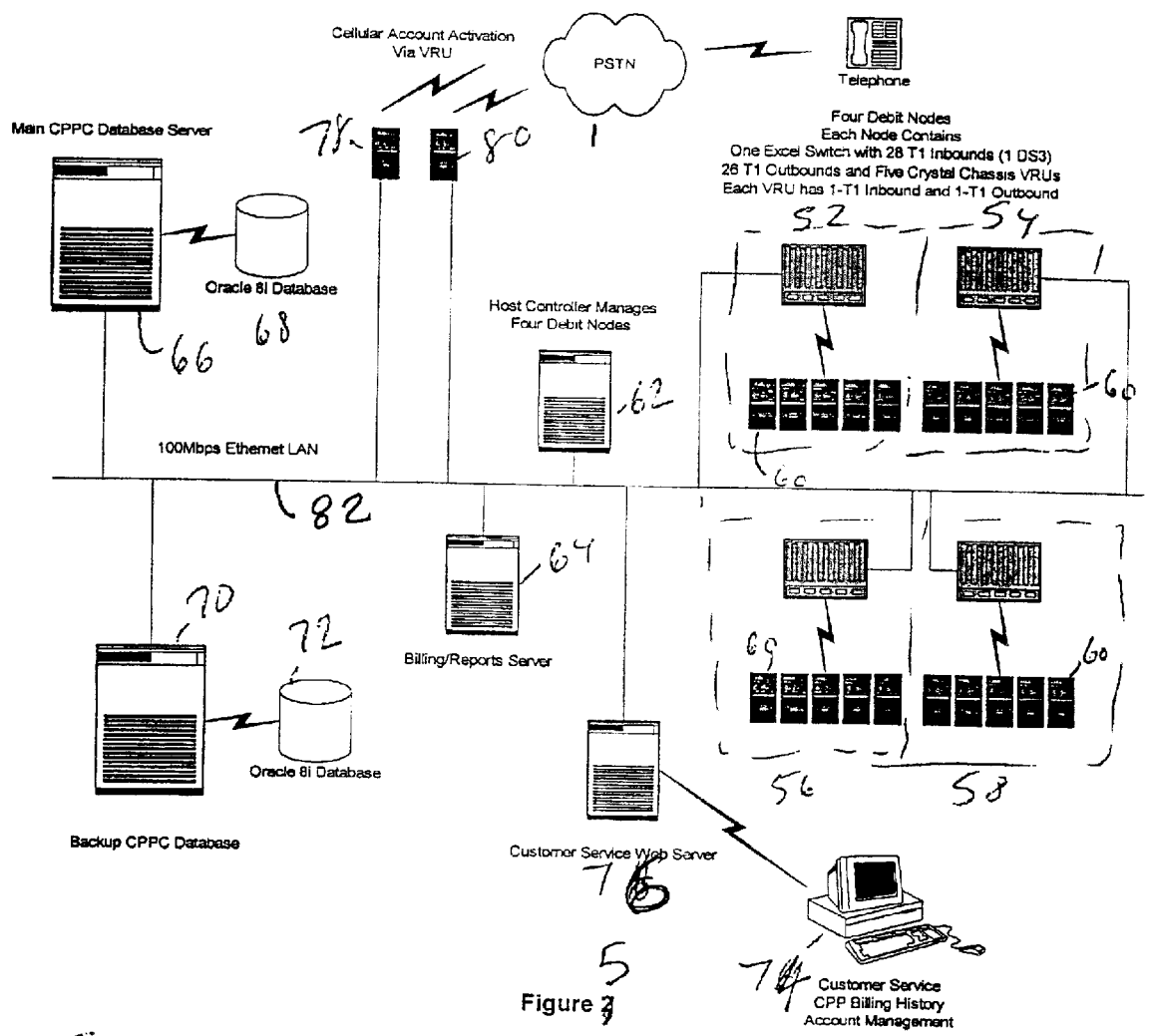
FIG. 5 shows a block diagram of an illustrative payment platform for the system of FIG. 2.

In the discussion above and in the FIGS. it has been assumed that the administrating server 16A, switching network 17A and data base 18A are provided as a payment platform which is distinct and separate from the CSP 12. A payment platform 50 used to implement the server 16A, switching network 17A and data base 18A is shown in FIG. 5. Platform 50 includes four switching nodes 52, 54, 56, 58. Each node consists of a telephone switch 60 (such as an Excel switch) capable of handling 28 inbound T1 connections and 26 outbound T1 connections. Each switch 60 is controlled by five standard PCs 62. Preferably PCs 62 have a narrow chassis so that they can be fit into a relatively small enclosure. One such PC is made by Crystal Group, Inc. of Hiawatha, Iowa 52233.

The platform 50 further includes a host controller 62 which is used to manage the four nodes 52, 54, 56, 58. Billing and report functions are provided by a separate server 64. The data for the various subscribers is managed by a master data base server 66 associated with an Oracle-type data base 68. A back up server 70 is also used with its own data base 72.

Subscribers and other customers with a standard PC 74 can access information on the platform through a web server 76. More specifically, subscribers can check their balance, change the payment plans, add or delete names from their various lists, etc., by accessing their account on the Internet.

A server 78 can be contacted from a remote location and used to activate cellular telephone accounts. For example, the system may be set up such that a customer can walk into a retail outlet where he can apply for a new account, receive a cellular telephone and prepay for services on the cellular telephone. The information identifying the customer and other information is then sent in to the system through a telephone through server 78. Server 78 is set up to receive all information automatically. At a later time, the customer (who has now become a subscriber) can go back to the same retail outlet, or can go to another retail outlet to replenish his account by paying cash or presenting a credit card.

Another server 80 is provided to handle voice messages to and from third parties. This happens, for example, when a caller initiates a call to a subscriber using the payments described above. All voice messages to the caller, including instructions, are handled by the server 80.

All the components of the system are interconnected by an Intranet or LAN connection 82.

In an alternate embodiment of the invention, the payment platform components may be provided at the same location as the CSP 12. This latter configuration is advantageous because the voice channels between the switching network and the CSP 12 can be made directly without the need for a dedicated trunk or a PSTN. An additional advantage of this arrangement is that a connection to the subscribers A and B can be directly through the CSP 12 and hence the separate '800' numbers are not required.

In summary, a combined system providing prepaid wireless communication and caller party pays service is described which can be implemented using standard wireless networks. The system has several major advantageous features including the ability to bill outgoing calls through a prepaid debit system, the ability to bill incoming calls to the caller and/or the subscriber at the option of the subscriber, and the ability to provide substantially no billing leakage (i.e., all charges are properly billed).

The system has several advantages to wireless service providers, including the ability to provide a variety of payment and billing options to customers, the use of existing wireless networks, encouragement of the use and purchase of wireless telephones and associated services, increased revenues through prepaid accounts, elimination of extensive customer turnover rates, expansion of customer base, including private and business customers.

Moreover, customers and subscribers also benefit from this novel system because it allows them to use their prepaid wireless telephones even if there is no balance in their account, it allows customers to control their telephone costs, and it allows customers to customize the services by determining how to pay for calls from various callers.

Numerous modifications may be made to this invention without departing from its scope as defined in the appended claims.

We claim:

1. A method of making a call by a caller to a subscriber of a wireless service provider comprising:

placing a request for establishing a connection by said caller to said subscriber;

routing said request to an administrating server;

determining with said administrating server whether said call is chargeable to one of said caller and said subscriber based on a set of rules selected by said subscriber, said set of rules being based at least in part from the group consisting of the area code of the caller, the telephone number of the caller, the current time of the request and the current date of the request;

if said call is chargeable to said caller, establishing said connection with a wireless telephone associated with said subscriber; and charging said caller with the cost of said call.

2. The method of claim, 1 further comprising sending a message to said caller to alert the caller that he will be charged for said call.

3. The method of claim 2 further comprising requesting approval from said caller to charge said call before establishing said connection.

4. The method of claim 1 further comprising defining caller lists as part of said rules, including a first list.

5. The method of claim 4 further comprising charging said subscriber for calls from callers on said first list.

6. The method of claim 4 further comprising charging said caller for calls if said caller is not on said first list.

7. The method of claim 1 further comprising generating an account for said subscriber.

8. The method of claim 7 wherein said account is generated based on a prepaid card bought by said subscriber.

9. The method of claim 7 wherein said account is generated and replenished from another account associated with said subscriber.

10. A caller party pays wireless telephone system comprising:

a service provider adapted to provide wireless service to a cellular telephone of a subscriber;

an administrating server adapted to receive a request from a caller to establish communication with said subscriber, said administrating server being adapted to determine if said caller is chargeable for said call, and to establish a connection between said caller and said subscriber to said service provider in response to said request;

wherein said cellular service provider is adapted to assign a first telephone number for said subscriber and said administrating server is adapted to assign a second telephone number for said subscriber, wherein said request from said caller includes said second telephone number.

11. The system of claim 10 further comprising a payment platform adapted to provide calling card service to said subscriber.

12. The system of claim 11 wherein said platform includes said administrating server.

13. The system of claim 12 wherein said administrating server is adapted to receive a selection from a subscriber indicating a first mode wherein said caller is charged for the call and a second mode wherein said subscriber is charged for the call.

14. The system of claim 13 wherein said administrating server is adapted to generate a subscriber charge when said second mode is selected.

15. The system of claim 14 wherein said administrating server is adapted to monitor calls and is adapted to charge one of said caller and said subscriber dependent on the mode selected by the subscriber.

16. The system of claim 10 wherein said service provider generates a first charge for said administering server and said administering server generates a second charge dependent on said first charge.

17. The system of claim 16 wherein said second charge is charged to one of said caller and said subscriber in accordance with a mode selected by said subscriber.

18. The system of claim 10 wherein said administrating server is associated with a data base and is adapted to map said second to said first telephone number based on data from said data base.

19. The system of claim 10 wherein said cellular service provider and said server are connected by a standard communication line.

20. The system of claim 10 wherein said cellular service provider and said server are connected by a standard direct trunk line.

* * * * *